United States Patent [19]

Knoller et al.

[11] Patent Number: 5,054,973
[45] Date of Patent: Oct. 8, 1991

[54] TOOL BIT WITH AXIALLY EXTENDING GROOVES IN INSERTION END

[75] Inventors: Anton Knoller, Landsberg am Lech; Peter Kunert; Dieter Soehnlein, both of Kaufering, all of Fed. Rep. of Germany

[73] Assignee: Hilti Aktiengesellschaft, Schaan, Liechtenstein

[21] Appl. No.: 357,089

[22] Filed: May 25, 1989

[30] Foreign Application Priority Data

May 25, 1988 [DE] Fed. Rep. of Germany ....... 3817644

[51] Int. Cl.⁵ .............................................. B23B 51/00
[52] U.S. Cl. .................................................. 408/226
[58] Field of Search ........... 408/226, 232, 231, 230 R, 408/240, 238, 215; 76/108 PI, 108 T; 279/19–19.7, 76, 83, 66, 75, 72; 407/30, 383; 173/133, 128, 132; 175/320; 10/141 R

[56] References Cited

U.S. PATENT DOCUMENTS

| Re. 31,755 | 12/1984 | Wanner et al. | 279/75 X |
|---|---|---|---|
| 2,457,132 | 12/1948 | Delaney | 76/108 T |
| 4,123,074 | 10/1978 | Wanner | 279/19.5 |
| 4,273,344 | 6/1981 | Benson et al. | 279/75 |
| 4,290,617 | 9/1981 | Yoshida | 279/75 |
| 4,536,109 | 8/1985 | Hunger et al. | 408/240 |
| 4,565,472 | 1/1986 | Brennsteiner et al. | 408/226 |
| 4,702,651 | 10/1987 | Kleine | 408/226 |
| 4,725,173 | 2/1988 | Hoffman et al. | 408/240 X |

OTHER PUBLICATIONS

*Drilling Technology,* p. 32, 1977.

*Primary Examiner*—Larry I. Schwartz
*Assistant Examiner*—Robert Schultz
*Attorney, Agent, or Firm*—Toren, McGeady & Associates

[57] ABSTRACT

A tool bit has a body (1) with an axially extending insertion end (2) for insertion into a chuck on a drive unit. The insertion end (2) has closed ended axially extending grooves (4) and axially extending grooves (5) open at the trailing end of the insertion end. The open end grooves have a base (6) with a shaped configuration (7). The shaped base has depressions or recesses (8) forming stop faces (9) extending transversely of the axial direction and acting essentially in the axial direction of the insertion end. When the insertion end (2) is placed into the chuck, any dirt on the stop faces (9) can be wiped off and deposited in the recesses (8). The shaped configuration (7) of the base (6) prevents, during formation of the axially extending grooves (4, 5), by means of grooving tools rolling in the axial direction of the insertion end (2), any undesirable length changes in the insertion end while affording sharp-edges rolling of the shaped configuration.

8 Claims, 2 Drawing Sheets

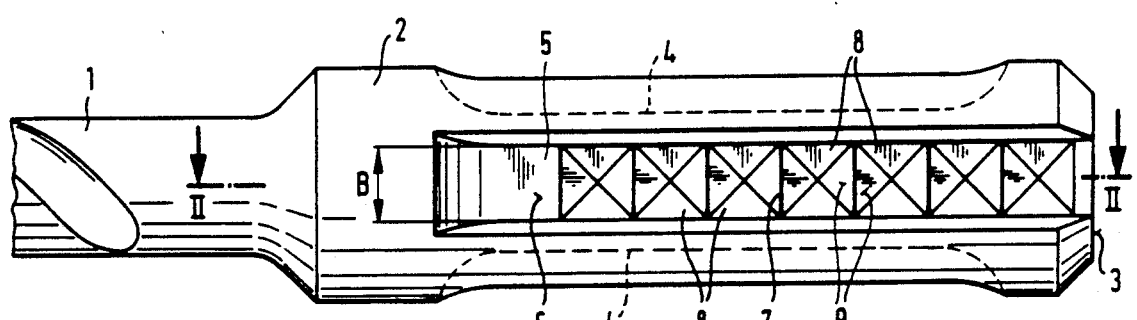
Fig. 1
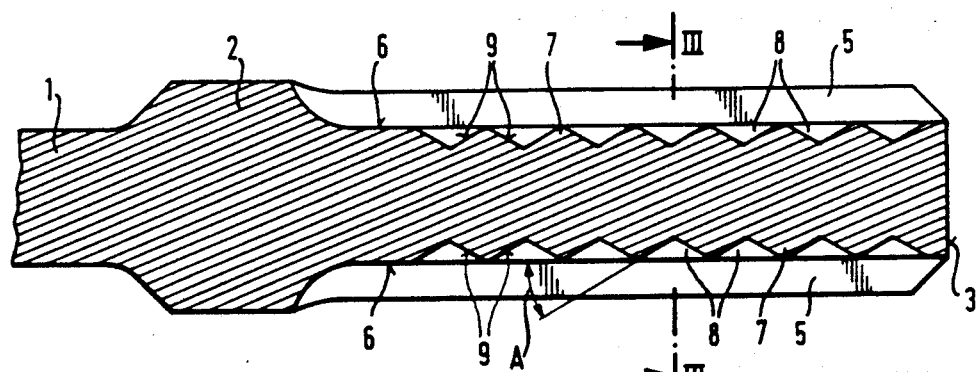
Fig. 2
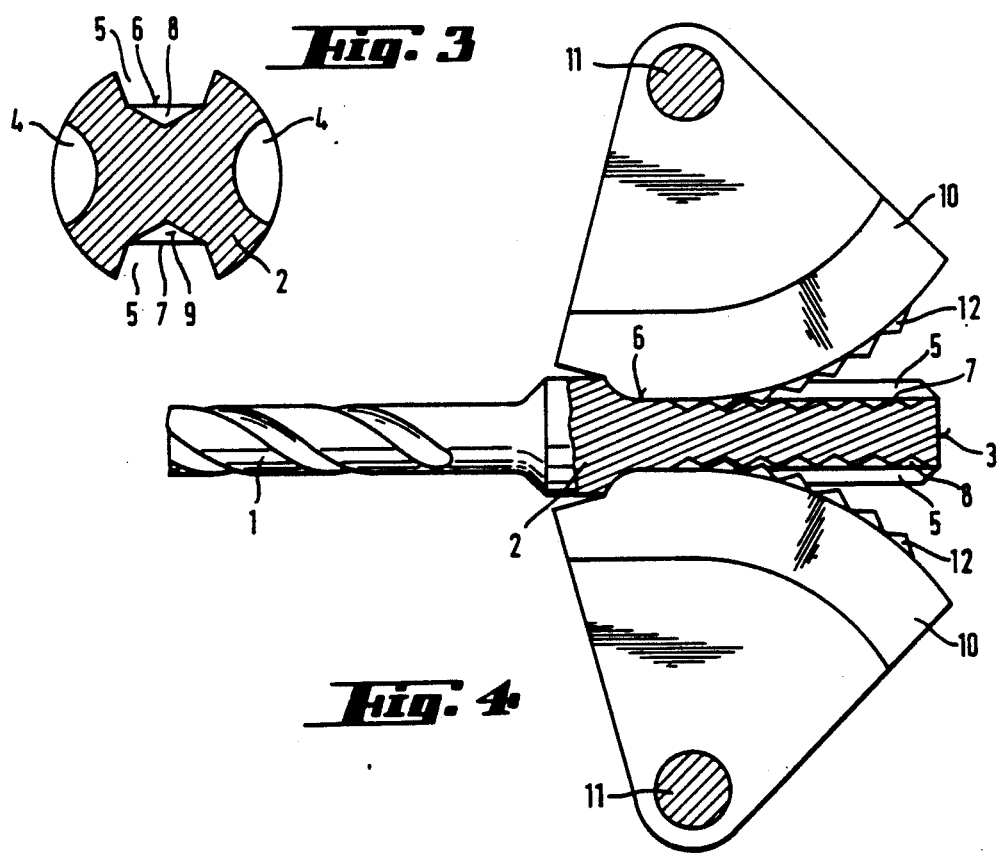
Fig. 3
Fig. 4

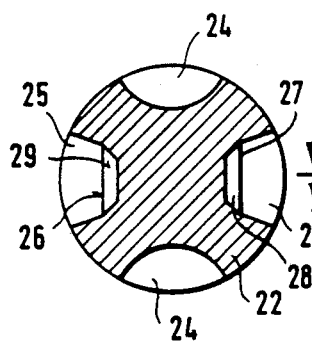
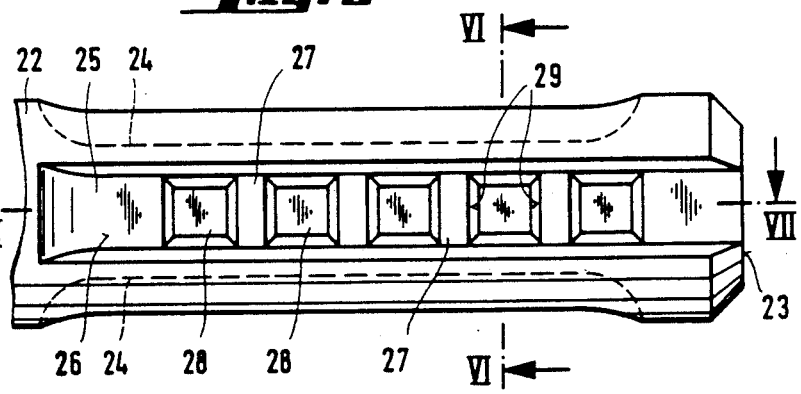
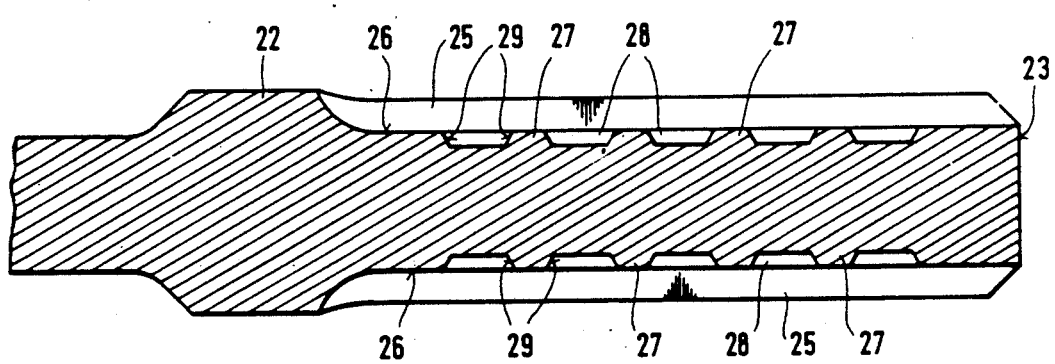
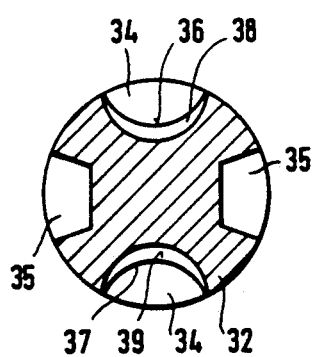
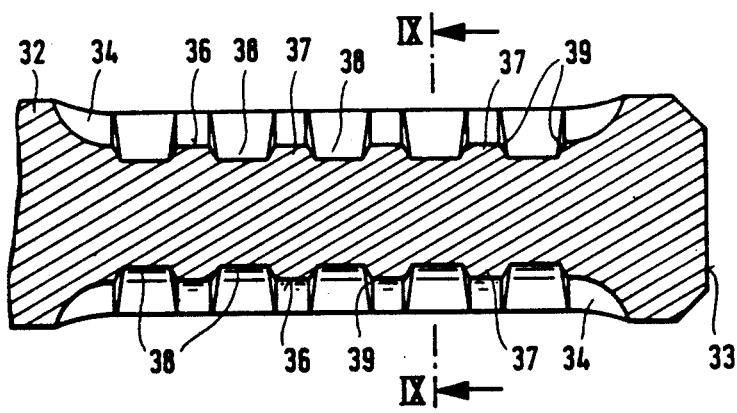

TOOL BIT WITH AXIALLY EXTENDING GROOVES IN INSERTION END

BACKGROUND OF THE INVENTION

The present invention is directed to a drill or chisel bit having an axially extending body with an axially extending insertion end for placement into a chuck on a drive unit. The insertion end has axially extending grooves for providing rotationally locked connection with and axially retention in the chuck.

Tool bits of the above-mentioned type are known, such as in DE-PS 2 551 125 and are used in particular for work in rock. When the tool bits are inserted into a chuck of a drive unit, stationary or radially displaceable locking elements engage in a positive locking manner into the axially extending grooves. The locking elements transmit torque to the tool bit and, at the same time, prevent the tool bit from being displaced out of the chuck.

In actual operation, the drill or chisel bits move in the axial direction in the drive unit chuck. Because of this axially directed movement, there is relatively great wear in the grooves as well as on the locking elements engaged in the grooves. Moreover, the axially extending grooves tend to accumulate dirt and can result in malfunction of the chuck, so that the tool bit can no longer be satisfactorily locked within and may be pushed out of the chuck during operation.

SUMMARY OF THE INVENTION

Therefore, the primary object of the present invention is to provide a tool bit with an axially extending insertion end provided with axially extending grooves so that the tool bit does not experience wear and the accumulation of dirt.

In accordance with the present invention, at least a part of the axially extending grooves has a profiled or shaped configuration in the base of the grooves forming stop faces which act essentially in the axial direction.

By shaping the base of the grooves, individual recesses or depressions are formed and can be filled with lubricant, such as grease, before the tool bit is used. Surfaces in the shaped base can serve to wipe dirt, so that the dirt is displaced into the recesses formed by the shaped configuration. A portion of the lubricant is ejected from the recesses by the dirt deposited in them, whereby the remaining portions of the grooves are lubricated. Due to such lubrication, the wear on the insertion end as well as on the locking elements in the chuck engaging the grooves is considerably reduced.

Preferably, the shaped configuration of the groove base has a tooth-like profile forming recesses uniformly distributed along the axial length of the groove.

In an expedient manner, the angle of pressure of the teeth formed in the shaped base is in the range of 30° to 60° relative to the tool bit axis. With the angle of pressure in this range, the shaped configuration is effected without cutting and provides edges facilitating a wiping-off of any dirt accumulation. In addition, recesses formed between the individual teeth are adequate to receive lubricant.

The shaped configuration is formed in an appropriate manner by recesses or depressions. The recesses can be cone-shaped or pyramidally-shaped. Pyramidally-shaped recesses result in a minor notch effect in the groove base, since the maximum depth is located at a single point and the depth decreases outwardly on all sides from this point. In addition, the advantageous visual appearance of such a shaped configuration cannot be neglected.

Preferably, the length of the sides of the recesses or depressions correspond advantageously to the width of the axially extending groove at its base. Thus, the shaped configuration extends essentially across the entire width of the axially extending groove. As a result, the locking element in a chuck engaging in the groove is completely wiped off by the shaped configuration, so that it is cleaned and possibly coated with lubricant contained in the recesses formed by the shaped configuration.

Preferably, the insertion end has two axially extending closed ended grooves disposed diametrically opposite one another and two other axially extending grooves with a shaped configuration in the groove base and with one end of such grooves being open at the trailing end of the insertion end. Accordingly, the grooves of the two sets are offset 90° with respect to one another. The axially closed ended grooves are intended for receiving radially displaceable locking elements and serve for the axial retention of the bit in the chuck. The other axially extending grooves, open at the trailing end and provided with the shaped configuration in the base, serve for rotational entrainment and cooperate with locking elements in the chuck formed as radially stationary projections. The shaped configuration or profiled surface in the groove base of the axially extending grooves open at the trailing end enables along with the projections in the chuck a cleaning process of the grooves during each insertion of a tool bit.

The axially extending grooves open at the trailing end have advantageously an essentially U-shaped cross-section with the groove base having the shaped configuration located between the groove legs and extending in a planar manner. The groove base extending in a planar manner and provided with a shaped configuration affords a relatively small depth of the open ended axially extending grooves open at the rear end and prevents any appreciable cross-sectional weakening of the insertion end. The groove base extending in a planar manner and provided with a shaped configuration can be easily produced and affords efficient cleaning.

Preferably, the axially extending grooves are rolled into the insertion end by means of rolling tools moving in the axial direction of the insertion end. As a result, the formation of the axially extending grooves takes place without any machining operations. Such a fabrication of the grooves without machining is considerably more economical and affords considerable savings. Another considerable advantage of groove formation without machining is that the material is compacted in the region of the grooves by the groove rolling operation and higher strength values are developed. Additional machining operations such as deburring, can be eliminated by avoiding machining procedures. During production, preferably all of the axially extending grooves are rolled simultaneously into the insertion end. By a symmetrical arrangement of the axially extending grooves, the relatively high laterally acting forces are compensated.

In the rolling operation, at least a portion of the grooving tools have a shaped configuration matching the shaped configuration of the groove base. As a result, the formation of the axially extending grooves and the shaping of the groove base can take place at the same time. Due to the positive locking interengagement between the groove base and the shaped configuration of the grooving tool, excessive length changes and a resulting reduction of the cross-section in the region of the groove edges is prevented when the method of rolling the axially extending grooves is employed Such a contraction or reduction of the cross section or a rounding-off of the edge region is undesirable, especially in axially extending grooves serving for the transmission of torque because such reduction could result in very high area pressures causing wear.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is an axially extending side view of a portion of a tool bit embodying the present invention;

FIG. 2 is an axially extending sectional view of the tool bit shown in FIG. 1 and taken along the line II—II;

FIG. 3 is a cross-sectional view through the tool bit in FIG. 2 taken along the line III—III;

FIG. 4 is an elevational view, partly in section, illustrating diagrammatically the formation of the tool bit in accordance with the present invention;

FIG. 5 is an axially extending side view, similar to FIG. 1, displaying another tool bit in accordance with the present invention;

FIG. 6 is a cross-sectional view through the tool bit displayed in FIG. 5, and taken along the line VI—VI;

FIG. 7 is an axially extending sectional view through the tool bit in FIG. 5, taken along the line VII—VII;

FIG. 8 is an axially extending sectional view of still another tool bit in accordance with the present invention; and FIG. 9 is a cross-sectional view through the tool bit in FIG. 8, taken along the line IX—IX.

DETAILED DESCRIPTION OF THE INVENTION

In FIGS. 1 to 4, a portion of a tool bit is shown comprising an axially elongated body 1 with an axially extending insertion end at the trailing end of the shank. The insertion end is inserted into a chuck in a driving unit, not shown. The trailing end 3 of the insertion end 2, that is, the end first inserted into the chuck, is planar. Insertion end 2 has two axially extending closed ended grooves 4 disposed diametrically opposite one another and two axially extending grooves 5, each open at the trailing end 3. The grooves 5 are offset by 90° compared to the grooves 4, so that the grooves are equiangularly spaced around the insertion end 2. In cross-section, the closed ended grooves 4 have an arcuate concave configuration, note FIG. 3. The open ended grooves 5 have a planar base 6, note FIG. 2. The groove base 6 is formed with a toothed-like rack-shaped configuration 7. The angle of pressure A, note FIG. 2, of the shaped configuration 7 relative to the axis of the tool bit is in the range of 30° to 60°. The shaped configuration 7 is formed by a plurality of adjacent pyramidally shaped recesses or depressions 8. The length of the sides of the recesses 8 correspond essentially to the width B of the open ended groove 5 at the groove base 6. Pyramidically-shaped recesses 8 form stop or abutment faces 9, extending transversely of the axial direction and acting essentially in the axial direction. Stop faces 9 afford a wiping-off of dirt accumulations when the insertion end 2 is placed into the drive unit chuck.

FIG. 4 affords a diagrammatical illustration of the formation of the drill bit displayed in FIGS. 1 to 3. The axially extending grooves 5 open at the trailing end 3 and provided with the shaped configuration 7 are rolled into the insertion end 2 by means of segment-shaped rolling grooving tools 10, which roll in the axial direction of the insertion end. Tools 10 are mounted on axes or shafts 11 so that they rotate about the axes which extend perpendicularly to the axes of the insertion end. The grooving tools are moved synchronously with one another by a drive unit, not shown. The grooving tools 10 have a shaped configuration 12 matching the shaped configuration 7 in the groove base 6. The counter-shaped configuration 12 prevents any excessive change in length in the insertion end 2 during the step of rolling the open ended axially extending grooves 5 and enables the formation of sharp edges on the shaped configuration. The axially extending groove 5 with its shaped configuration 7 is rolled preferably in a single pass directly for the full groove depths into the insertion end 2. As a result, the material of the insertion end is compacted affording an increase in strength in the region of the grooves 5 during the rolling operation.

In FIGS. 5-7, another tool bit is displayed having an axially extending insertion end 22 and a trailing end 23. Insertion end 22 has axially extending closed end grooves 24 and axially extending grooves 25 open at the rearward end 23. The open ended grooves 25 have a shaped configuration 27 in the groove base 26, formed by recesses or depressions 28. Stop faces 29 extending transversely of the axial direction and acting essentially in the axial direction are formed in the base 26 by the depressions 28. Stop faces 29 provide an axial clamping of the insertion end 22, while it is being formed by the method displayed in FIG. 4 and, as a result, prevent any unintended changes in length of the insertion end 22 during the rolling method of the closed ended and open ended axially extending grooves 24, 25.

In FIGS. 8 and 9, an insertion end 32 is set forth in FIGS. 8 and 9 with a trailing end 33. Insertion end 32 has axially extending closed ended grooves 34 and axially extending grooves 35 open at the trailing end 33. Closed ended grooves 34 are provided with a shaped configuration 37 in the base 36, made up of a number of recesses 38 with decreasing depth from the center of the groove toward the sides of the grooves 34, note FIG. 9. As a result, the recesses 38 form stop faces 39 extending transversely the axial direction and acting essentially in the axial direction. Stop faces 39 form shoulders which counter act any tendency to lengthen the insertion end 32 during the rolling operation.

While specific embodiments of the invention have been shown and described in detail to illustrate the application of the inventive principles, it will be understood that the invention may be embodied otherwise without departing from such principles.

We claim:

1. Drill bit or chisel bit comprising an axially elongated body (1) having an axially extending insertion end (2) at one end thereof for insertion into a chuck in a drive unit, said insertion end (2) having axially extending grooves (4, 5) for rotationally locked connection to and axial retention within the chuck, wherein the improvement comprises that said axially extending grooves comprises at least a first said groove and at least a second said groove, at least the second said groove (5) has an axially extending base (6), and said base (6) being shaped with a plurality of recesses (8) arranged one after the other in the axial direction and said recesses forming stop faces (9) extending transversely of the axial direction and affording a stop action acting assentially in the axial direction.

2. Drill bit or chisel bit, as set forth in claim 1, wherein recesses in the said base have a tooth shaped rack-like configuration (7) in axial section.

3. Drill bit or chisel bit as set forth in claim 2, wherein said tooth shaped rack-like configuration (7) comprises a number of teeth each having an angle of pressure A, arranged at an angle in the range of 30° to 60° relative to the axis of the insertion end.

4. Drill bit or chisel bit, as set forth in claim 2, wherein said recesses 8, 28, have sides therein with said sides having a length corresponding to a width B of the axially extending second said groove (5) at the base (6) thereof.

5. Drill bit or chisel bit as set forth in claim 4, wherein the insertion end (2) comprises two axially extending closed ended first said grooves (4) disposed diametrically opposite one another and tow axially extending open end second said grooves (5) having the recesses (8) in the base thereof and said open end second said grooves (5) being offset by 90° relative to the closed ended first said grooves (4).

6. Drill bit or chisel bit, as set forth in claim 5, wherein said insertion end (2) having a trailing end extending transversely of the axis thereof, said open ended second said grooves (5) have a U-shaped cross-section transversely of the axis and the base (6) having the recesses (8) extends in a planar manner and is disposed between legs of said U-shaped cross-section.

7. Drill bit or chisel bit as set forth in claim 5, wherein the axially extending closed ended first said grooves have an axially extending base.

8. Drill bit or chisel bit, as set forth in claim 7, wherein the plurality of recesses comprises in the axial direction a plurality of serially arranged shaped recesses (38).

* * * * *